(12) United States Patent
Cerveaux

(10) Patent No.: US 11,556,594 B2
(45) Date of Patent: Jan. 17, 2023

(54) COMMUNICATION METHOD FOR DATABASE

(71) Applicant: ETA SA Manufacture Horlogere Suisse, Grenchen (CH)

(72) Inventor: Augustin Cerveaux, Yverdon-les-Bains (CH)

(73) Assignee: ETA SA Manufacture Horlogere Suisse, Grenchen (CH)

( * ) Notice: Subject to any disclaimer, the term of this patent is extended or adjusted under 35 U.S.C. 154(b) by 124 days.

(21) Appl. No.: 16/148,485

(22) Filed: Oct. 1, 2018

(65) Prior Publication Data

US 2020/0104322 A1    Apr. 2, 2020

(51) Int. Cl.
*G06F 7/00* (2006.01)
*G06F 16/906* (2019.01)
(Continued)

(52) U.S. Cl.
CPC ........ *G06F 16/906* (2019.01); *G06F 16/9024* (2019.01); *G06F 16/9035* (2019.01);
(Continued)

(58) Field of Classification Search
CPC .... G06F 16/26; G06F 16/248; G06F 16/9035; G06F 16/9038; G06F 16/90332; G06F 16/9024; G06F 16/906; G06F 16/93
(Continued)

(56) References Cited

U.S. PATENT DOCUMENTS

| 7,117,443 B1 * | 10/2006 | Zilka ..................... G06Q 10/10 715/739 |
| 2006/0106847 A1 | 5/2006 | Eckardt, III et al. |
| 2007/0282699 A1 | 12/2007 | Kumar et al. |

(Continued)

FOREIGN PATENT DOCUMENTS

| CN | 101930433 A | 12/2010 |
| CN | 106897392 A | 6/2017 |

(Continued)

OTHER PUBLICATIONS

Examination report dated Feb. 4, 2022 in corresponding Indian Patent Application No. 202147013366 (5 pages).
Office Action dated Jul. 5, 2022, issued in corresponding Chinese patent application No. 201980058600.4 (with English translation).
(Continued)

*Primary Examiner* — Md I Uddin
(74) *Attorney, Agent, or Firm* — Oblon, McClelland, Maier & Neustadt, L.L.P.

(57) ABSTRACT

A method is provided of communication between a user and a database of Patents and also of the display and the interactive exploration of data on information of interest relating to Patents/Patent applications. The method comprises:
the generation, by means of an access interface, of a request allowing the database to be interrogated based on at least one selection criterion entered into the access interface;

(Continued)

the interrogation of the database by means of the request and the loading of bibliographical data for the Patents/Patent applications found, the downloaded bibliographical data comprising data on the technological category;

the processing of the bibliographical data, the processing comprising an analysis of co-occurrences comprising the determination of a number of co-occurrences of data on the technological category for all of the Patents/Patent applications found;

the displaying, in interactive graphical and/or textual form, of a result and/or of an interpretation of the analysis of co-occurrences.

15 Claims, 2 Drawing Sheets

(51) Int. Cl.
| | | |
|---|---|---|
| *G06F 16/93* | (2019.01) | |
| *G06F 16/9038* | (2019.01) | |
| *G06F 16/9032* | (2019.01) | |
| *G06F 16/9035* | (2019.01) | |
| *G06F 16/901* | (2019.01) | |

(52) U.S. Cl.
CPC .... *G06F 16/9038* (2019.01); *G06F 16/90332* (2019.01); *G06F 16/93* (2019.01)

(58) Field of Classification Search
USPC .................. 707/722, 738, 776, 728, 766
See application file for complete search history.

(56) References Cited

U.S. PATENT DOCUMENTS

| | | | |
|---|---|---|---|
| 2013/0262142 A1 | 10/2013 | Sethumadhavan et al. | |
| 2014/0046895 A1* | 2/2014 | Sowani ................. | G06Q 30/02 706/52 |
| 2016/0246851 A1* | 8/2016 | Abe ..................... | G06F 16/3334 |

FOREIGN PATENT DOCUMENTS

| | | |
|---|---|---|
| EP | 2 487 601 A1 | 8/2012 |
| JP | 5-61984 A | 3/1993 |
| WO | 2009/075554 A2 | 6/2009 |

OTHER PUBLICATIONS

Notice of Reason for Refusal dated May 10, 2022, in Japanese Patent Application No. 2021-507566 (with English-language translation).

* cited by examiner

COMMUNICATION METHOD FOR DATABASE

TECHNICAL FIELD

In general terms, the invention relates to the communication between a database and a user. More precisely, the invention relates to a method for displaying and for interactive exploration of data on information of interest relating to Patents/Patent applications.

TECHNOLOGICAL BACKGROUND AND TECHNICAL PROBLEM

Patent information includes the technical content (description, claims and drawings) of the Patent documents (publications of Patent applications or of Patents) together with bibliographical data, such as the data on the filing party or parties, the inventor or inventors, technical classification information, the priority date, the filing date, etc. It constitutes the first source of first-hand information on novel and innovative technologies.

There are two main uses of the Patent information. The qualitative analysis relates to the content of the individual documents. The quantitative analysis relates to sets of Patent documents and essentially to their statistical processing.

Numerous Patent offices maintain Patent databases freely accessible on line to the public. One of the major databases to be mentioned in this context is "Espacenet", made available by the European Patent Office. Other databases are marketed by private organizations. These databases, e.g. Derwent Innovation, Questel Orbit, PatBase, etc., are supplied from public databases but offer added value in the form of complementary information, of access interfaces and/or of higher performance data processing tools.

This industry has developed numerous types of data display formats based, at least in part, on the IPC (International Patent Classification) classification data. In the interfaces, a common display format is to represent the absolute distribution of the classes within a pool of Patents. One example of such a representation is the pie chart. In this type of display format, only the number of occurrences of each class within the pool of Patents is represented, i.e. the number of times an IPC class is cited in the Patents of the pool. The utility of this type of graph is somewhat limited for extracting information. Moreover, the reading of the diagram is difficult because the display tools typically display either the alphanumeric symbol of the class or the whole title (the wording) of the class. There exist variants of the "pie chart" theme that facilitate the reading. The basic idea remains however that where the number of Patents in an IPC class is higher, the more space (surface area) is allocated to this class.

Some commercial display tools of the Patent databases include a "technological clustering". The pool of Patents is, in this case, divided into technological fields and sub-fields according to unknown criteria. Although these representations are often visually successful, they are difficult to interpret, because the segmentation analysis algorithms (known as "clustering algorithms") operate as "black boxes".

Another example of display format based, amongst other things, on IPC data is the representation in "Patent landscape" mode or "technology landscape" mode. The pool of Patents is, in this case, represented by a series of key words disposed according to a mutual proximity indicator in a 2D or 3D space. The key words may be produced by heterogeneous data from the pool of Patents: IPC classification, abstract, claims, etc. The mode of obtaining the key words together with the calculation of the distance between the key words is opaque.

The conclusions drawn from representations of "technological clustering" or of "Patent landscapes" accordingly contain a significant element of subjectivity, or of speculation. There is furthermore the risk that niche applications only appear whenever the corresponding segment reaches a certain size or a corresponding key word is recognized by the algorithm as "worthy" of being displayed.

GENERAL DESCRIPTION OF THE INVENTION

According to one aspect of the invention, a method of communication is provided between a user and a database of Patents and also for the display and interactive exploration of data on information of interest relating to Patents/Patent applications, e.g., bibliographical data, notably IPC data. The method comprises:

the generation, by means of an access interface, of a request allowing a database of Patents (commercial or free access) to be interrogated using at least one selection criterion entered into the access interface by the user;

the interrogation of the database by means of the request and the downloading (typically via a local network and/or the Internet) of bibliographical data for the Patents/Patent applications found by the database, the bibliographical data downloaded comprising data on the technological category;

the processing of the bibliographical data, the processing comprising a co-occurrence analysis, the co-occurrence analysis comprising the determination of a number of co-occurrences of data on the technological category for all of the Patents/Patent applications found;

the displaying, in interactive graphical and/or textual form, of a result and/or of an interpretation of the co-occurrence analysis.

The data on the technological category will preferably comprise technological classification symbols according to a system of hierarchical classification, for example, IPC, CPC (Cooperative Patent Classification) USPC (United States Patent Classification) or other classification symbols.

As indicated hereinabove, the analysis of co-occurrences comprises the determination of the number of co-occurrences of data on the technological category for all of the Patents/Patent applications found. In other words, the analysis of co-occurrences asks the question to know how many times the same group of data on the technological category appears in the Patents/Patent applications of the set examined. According to a preferred embodiment of the method, the analysis of co-occurrences relates to doublets (pairs) of data on the technological category, where the order of the data on the technological category may be either taken into account or neglected (the second alternative being preferred).

As an alternative or in addition, the analysis of co-occurrences may relate to triplets (sets with three elements) of data on the technological category.

The analysis of co-occurrences may comprise the creation of a table or matrix representing the set of all the possible combinations of data on the technological category. Subsequently, for each combination, the number of Patents having this combination of data on the technological category (as such or as a sub-combination) is determined. The computer executing this part of the method may perform this determination by running through the list of Patents and incrementing counters associated with the various combinations of data on the technological category found for each Patent.

Preferably, the display comprises control objects made available to the user (e.g. buttons, icons, thumbwheels, hyperlinks, etc.) whose actuation or manipulation (by a mouse, a touch screen or any other pointing device) leads to a new execution of the analysis of co-occurrences with modified parameters. For example, the analysis of co-occurrences could be based on the IPC classification down to the sub-class level, whose symbol is composed of a letter followed by a number with two digits and by another letter. The control objects could be configured to trigger a new execution of the analysis of co-occurrences that could be based on a higher level (section or class) or lower level (main group or sub-group) of the IPC classification.

Additionally or alternatively, the display may comprise control objects made available to the user whose actuation or manipulation leads to a filtering of the Patents/Patent applications found by the database and the generation of a corresponding sub-set of Patents/Patent applications. The actuation or the manipulation of the control objects could also lead to an execution of an analysis of co-occurrences of the data on the technological category restricted to the sub-set of the Patents/Patent applications.

According to a particularly preferred embodiment of the invention, the display of the result of the analysis of co-occurrences will take the form of a network graph in three dimensions. Of course, a display in the form of a network graph in two dimensions is also possible.

The display may comprise the displaying of the result of the analysis of co-occurrences in the form of an interactive network graph. Such a network graph could comprise nodes and links respectively between two nodes, the nodes representing technological classification symbols and the links between two nodes the co-occurrences of the technological classification symbols corresponding to the two connected nodes.

A visual attribute of each node (e.g. its size, its diameter, the thickness of its contour, the intensity of its colour, its transparency, etc.) could reflect the number of occurrences of the corresponding technological classification symbol and a visual attribute of each link (e.g. its thickness, the intensity of its colour, its transparency, etc.) could reflect the number of co-occurrences of the technological classification symbols corresponding to the two connected nodes.

Preferably, the nodes and/or the links form interactive elements configured for triggering, following an action by the user (e.g. single click, right click, double-click, etc.), a new execution of the analysis of co-occurrences with modified parameters together with a new display of the result of the new analysis of co-occurrences in the form of an interactive network graph.

Additionally or alternatively, the nodes and/or the links could constitute interactive elements configured for triggering, following an action by the user, a filtering of the Patents/Patent applications found by the database, the generation of a corresponding sub-set of Patents/Patent applications, execution of an analysis of co-occurrences of the data on the technological category restricted to the sub-set of Patents/Patent applications and a display, in the form of an interactive network graph, of the result of the analysis of co-occurrences restricted to the sub-set. The analysis of co-occurrences could comprise simple applications of graphical theory, in order to for example indicate the distance between two nodes, according to the actions of the user.

The analysis of co-occurrences could relate to triplets of technological classification symbols. In this case, the display could comprise the display of the result of the analysis of co-occurrences in the form of an interactive network graph with nodes and complex links between three nodes, respectively, the nodes representing technological classification symbols and the complex links between three nodes the co-occurrences of the technological classification symbols corresponding to the three connected nodes. The complex links could be represented by coloured triangles, stars with three apices, or similar shapes, connecting the three respective nodes.

Preferably, the representation of the interactive graph intended to be displayed is generated by means of an artificial intelligence algorithm taking into account the complexity of the graph. The algorithm could, e.g., adjust parameters reducing the complexity of the representation if it detects that the representation would otherwise become too cluttered. The display could comprise graphics control elements (sliders, rotary selector switches, or others) allowing the user to change the parameters chosen by default and/or by the algorithm.

The representation of the interactive graph preferably comprises labels associated with the nodes and/or with the links. The labels may be generated on the basis of definitions of the hierarchical classification symbols. Preferably, the labels displayed are summaries of the official identifiers. An artificial intelligence algorithm could be employed to summarize the official identifiers and generate labels adapted to the display of the graph.

BRIEF DESCRIPTION OF THE DRAWINGS

Other advantages and features of the invention will become apparent from the detailed description of one advantageous embodiment presented hereinbelow, by way of illustration, with reference to the appended drawings which show.

DETAILED DESCRIPTION

One preferred example of the invention relating to the field of Patent information will be discussed in the following. The implementation provided facilitates the analysis of a pool of Patents by means of an interactive graphical representation (display) of this pool. In the field of Patent information, those skilled in the art will often need to analyze data associated with a large number of Patents previously identified according to certain criteria (key words, assignees, inventors, technological classes, etc. or combinations of the latter). The pool of Patents obtained corresponds (potentially after manual tidying up) to a well defined topic of interest—on a technology, a function, a group of assignees, etc.—for which the Patent analyst wishes to extract information and to provide interpretations. The display of the data associated with this pool allows relevant information to be quickly extracted. For example, the number of Patents per assignee may be displayed, which allows the main actors in the field of invention associated with the pool to be immediately deduced from this.

The embodiment discussed by way of example makes use of the IPC technological classification data. Patent offices classify each Patent according to a very structured and hierarchized classification of technical fields. A pool of Patents therefore comprises a set of IPC classes. The most represented classes in the pool indicate the main technical fields to which the pool of Patents relate. The analysis of the data on the representation of the classes in the pool allows relevant information to be extracted on the structuring of the pool, and hence on the structuring of the specific topic of interest, object of the Patent analysis.

Figure 1:
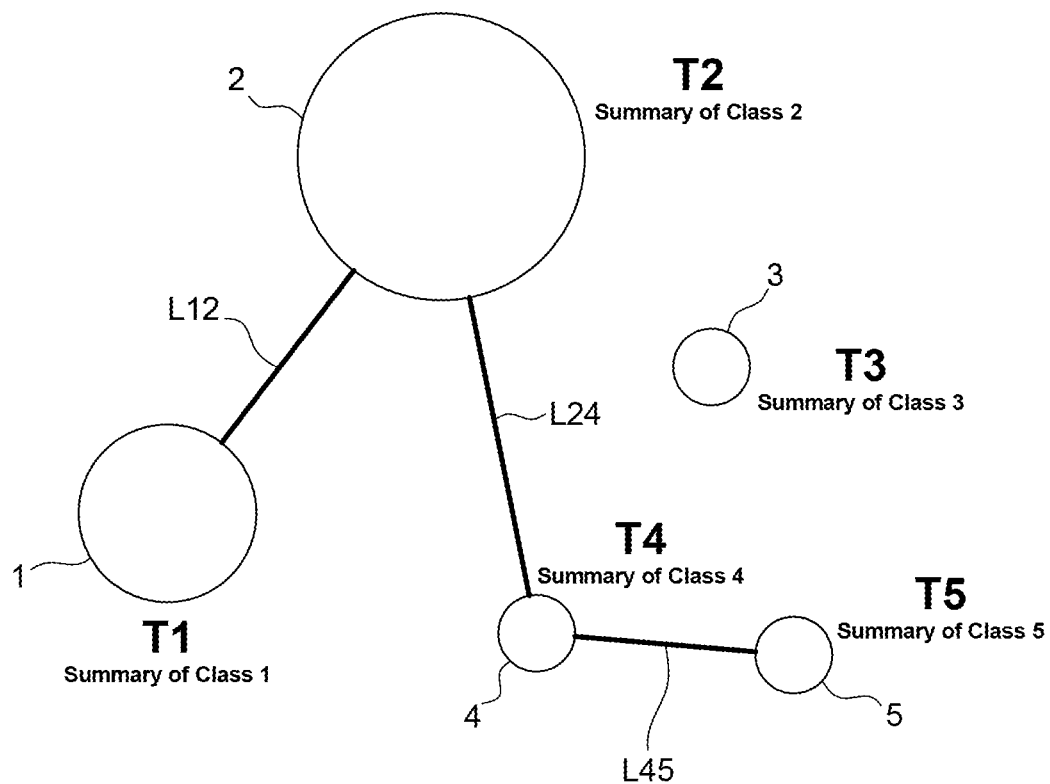
FIG. 1: one example of network graph illustrating the occurrences and the co-occurrences of technological classes of a set of generic Patents.

In order to assist the Patent analyst in his/her interpretation of the pool and in the exploration of the data relating to it, a display of the IPC classes of the pool is provided by means of a representation in the form of a network graph (see FIG. 1). Each Patent or Patent application is classed in one or more technological classes of the IPC classification. The network graph comprises nodes 1, 2, 3, 4, 5 and links L12, L24, L45 respectively between two nodes: the nodes represent technological classification symbols and the links between two nodes the co-occurrences of the technological classification symbols corresponding to the two connected nodes. The technological classification symbols represented by the nodes may belong to various hierarchical levels of the IPC. The complete IPC symbol corresponds to the "main group" or "sub-group" levels. A network graph whose nodes all represent a complete IPC symbol can become very complex and cluttered if the number of Patents in the pool increases. In the implementation provided, the network graph is interactive, so as to allow the user to reduce or to increase the complexity of the graph over the entirety or one (of the) part(s) of the network.

The size of each node is linked to the relative weight of the corresponding class in the pool; similarly, the thickness of each link depends on the number of Patents connecting the two classes, i.e. on the number of Patents which belong to both of the two connected classes.

In order to facilitate the analysis, the display includes a label T1, T2, T3, T4, T5 next to each node 1, 2, 3, 4, 5 using the identifier of the associated class (or a summary of the latter) and/or the alphanumeric symbol of the class.

The identifier of the class is sometimes long (several tens of words), in particular in the highest hierarchical levels of the classification. If the identifier of the class were completely displayed as a label for each node, the graph would risk becoming unreadable and hence unusable. In order to overcome this problem, semantic analysis techniques and automatic processing of the natural language are applied so as to reduce the identifier to a small number of key words. The length of the identifier and the size of the font are adapted on a case by case basis to the space available in the display.

In this way, the Patent analyst does not have to look for the meaning of the IPC symbols in the IPC classification and can quickly extract relevant information on the Patent pool in question, and hence on the specific topic of interest.

As explained above, the Patent analyst can choose the level of detail of the classes displayed according to his/her preferences, from the highest hierarchical level of the IPC classification down to the lowest. The display of the identifier of the class is, in this case, adapted according to the chosen hierarchical level.

By way of illustration, a more detailed example is discussed hereinbelow with the aid of the figures. It is assumed that the search in the database of Patents has returned a pool (set) of Patents in which 5 classes (numbered 1 to 5) are represented, with certain connexions between the classes. Table 1 hereinbelow informs on:

in the diagonal, the number of Patents belonging to the respective class, and in the upper right part, the co-occurrences of all the pairs of classes, i.e. the number of Patents that belong to both the class indicated by the column and the class indicated by the row.

For example, in this pool, 7 Patents belong to the class 1 and there are 6 Patents categorized in both the classes 1 and 2.

TABLE 1

| Class no | 1 | 2 | 3 | 4 | 5 |
| --- | --- | --- | --- | --- | --- |
| 1 | 7 | 6 | 0 | 0 | 0 |
| 2 |   | 9 | 0 | 3 | 0 |
| 3 |   |   | 3 | 0 | 0 |
| 4 |   |   |   | 4 | 1 |
| 5 |   |   |   |   | 3 |

It is noted that the lower left part of the table has been left empty in order to avoid inserting redundant indications. The usual matrices of graphical theory (notably the weighted similarity matrix) may be deduced from this table, and usefully exploited in the analysis of the co-occurrences.

A network graph associated with the pool of this example is shown in FIG. 1. It can be seen that the class 1 only has co-occurrences with the class 2 (on 6 Patents, link L12). On the other hand, the class 2 has further co-occurrences with the class 4 (on 3 Patents, link L24). The latter appear together with the class 5 on a single Patent (link L45). The class 3 is an isolated class.

The display obtained can assist the Patent analyst in the interpretation of the data of the pool. The assumption is that a Patent filed under several separate classes corresponds to an overlap between these classes. In particular, when the classes are very far apart in the IPC structuring (it is possible to define a distance in the IPC as a function of the number of branches that need to be traversed in the tree structure in order to go from one class to the other), a set of Patents belonging to heterogeneous classes involves an interdisciplinary or reconciliation effort between the associated technological fields.

The information coming from the display of the data can allow the Patent analyst to make several relevant interpretations. For example, the Patent analysis may be used to search for potential partners. Taking the case where, over the well-defined topic of interest associated with the pool of Patents, a particular niche application is sought. This niche application is present in a few Patents, but does not correspond to an industrial sector likely to market technologies corresponding to the niche application of (FIG. 1, class 5). The display obtained allows the technological field and/or industrial sector likely to provide solutions for developing the niche application (namely the class 4) to be identified. It can be observed that the class 5 does not have a direct link with the class 2, which however represents the main technological field of the defined topic of interest, although there does exist a fairly strong link between the classes 2 and 4 (link L24). The Patent analyst may therefore pose the question whether it is not possible to establish a direct link between the classes 2 and 5, as a complement to the class 4 or by bypassing the latter.

Another exemplary application is the analysis of the innovation dynamic by means of an identification of technology transfers between industrial sectors. The case is considered where the defined topic of interest is dominated by a well established technological field (here represented by the class 2), carried by an industrial sector and a set of clearly identified technological fields. On this topic of interest, a new application is beginning to emerge, carried by a few actors and associated with a distinct technological field (here represented by the class 4). The display obtained allows a significant filing of Patents to be identified belonging to the 2 associated classes, and hence potentially a transfer of technologies, in progress or actual, between a mature technological field and an emerging field.

The network graph displayed as the result of the analysis is interactive. Various types of control elements may be generated and made available to the user. In the network graph in FIG. 1, the nodes 1, 2, 3, 4 and 5 are configured as interactive elements. If the user right clicks on one of the nodes, a scrolling menu with the various commands available is displayed. One of the commands could trigger a drop in the hierarchy of the technology classification to a lower level. This command leads to the display of more detail within the selected class. When the user chooses to display the detail of the class 1, the programme re-does the analysis of the occurrences and of the co-occurrences under the constraint that the hierarchically lower classes are processed individually. One result of this step is found in Table 2, hereinbelow:

TABLE 2

| Class no | 1.1 | 1.2 | 1.3 | 2 | 3 | 4 | 5 |
|---|---|---|---|---|---|---|---|
| 1.1 | 1 | 0 | 0 | 0 | 0 | 0 | 0 |
| 1.2 |   | 2 | 1 | 1 | 0 | 0 | 0 |
| 1.3 |   |   | 5 | 5 | 0 | 0 | 0 |
| 2 |   |   |   | 9 | 0 | 3 | 0 |
| 3 |   |   |   |   | 3 | 0 | 0 |
| 4 |   |   |   |   |   | 4 | 1 |
| 5 |   |   |   |   |   |   | 3 |

Figure 2:
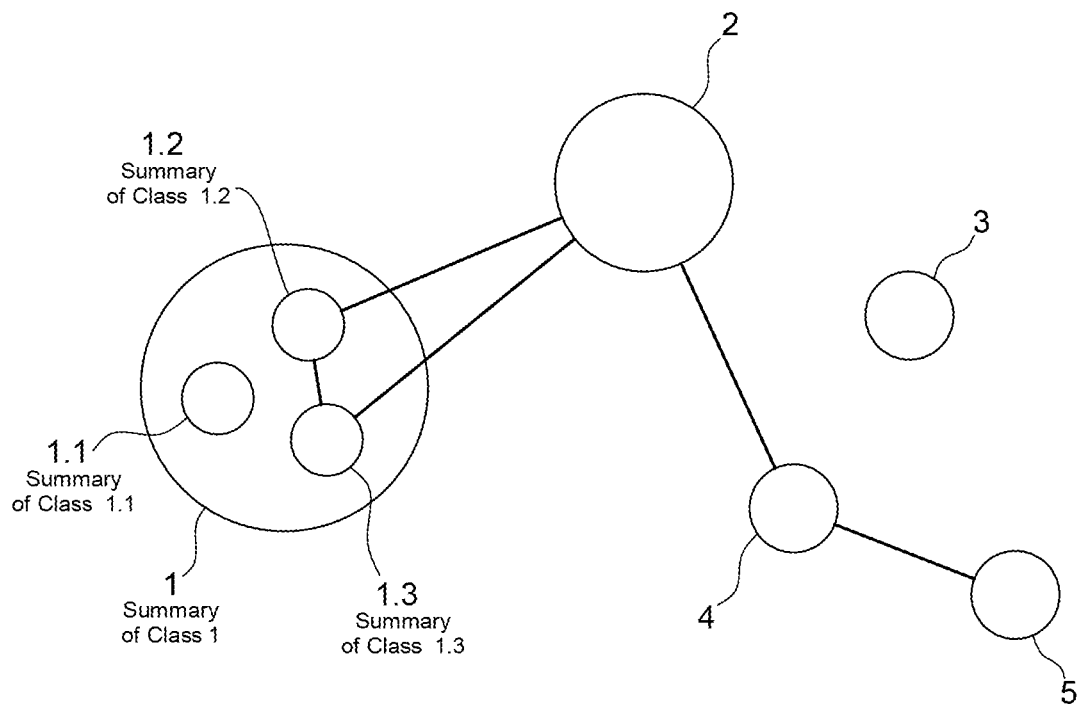
FIG. 2: a variant of the network graph in FIG. 1 with a "zoom" onto the inner details of the class 1.

The corresponding network graph is illustrated in FIG. 2.

In a similar manner, another command accessible via the interactive graph could result in a raising of the hierarchy of the technology classification. In this case, several classes would be combined into a hierarchically higher class.

Figure 3:
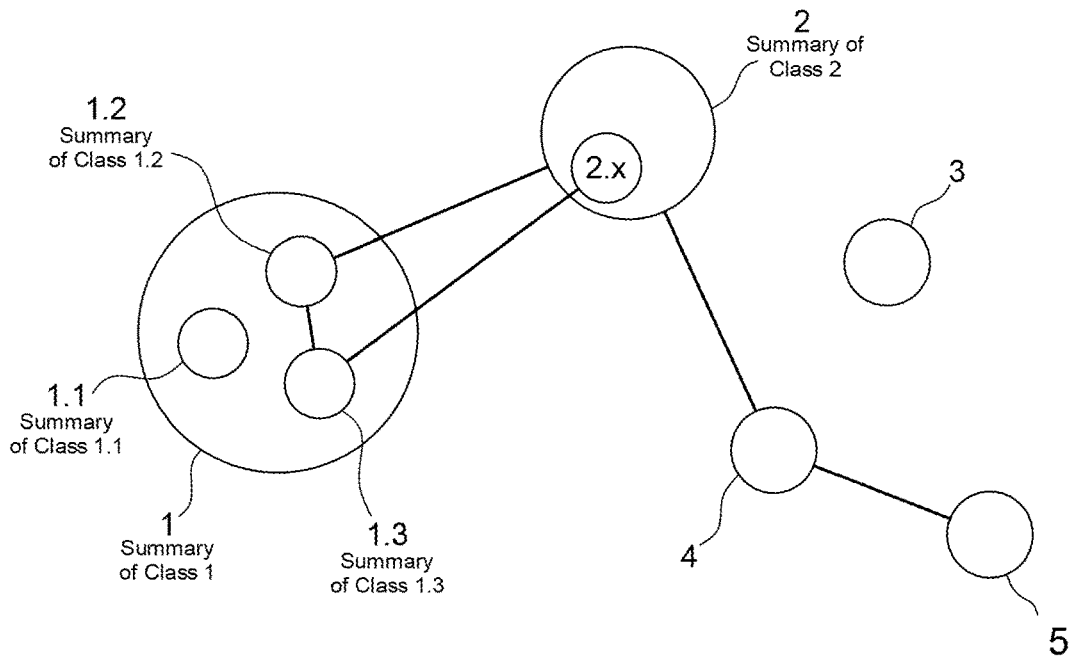
FIG. 3: a variant of the network graph in FIG. 2 partially showing the inner details of the class 2, in particular its largest sub-class or that having the most links.

FIG. 3 illustrates another functionality of the analysis tool, namely the possibility for the user to display, inside of a node (here that of the class 2), a node corresponding to the largest sub-class or the sub-class having the most links (ici: 2.x).

Another command, accessible via the interactive graph, could lead to the calculation of the distance of the node selected with respect to another node previously selected by the user.

Exemplary Application

Assume that the problem posed to the Patent analyst is the following: in the framework of night vision of watches, and of the illumination of the hands and dials, find a substitute for superluminova (trademark) using a bioluminescent pigment. The specific topic of interest of the Patent analyst is therefore bioluminescence. The idea is to find the technological fields the most likely to provide bioluminescent technologies adapted to the illumination of the cover parts for watches and clocks.

Figure 4:
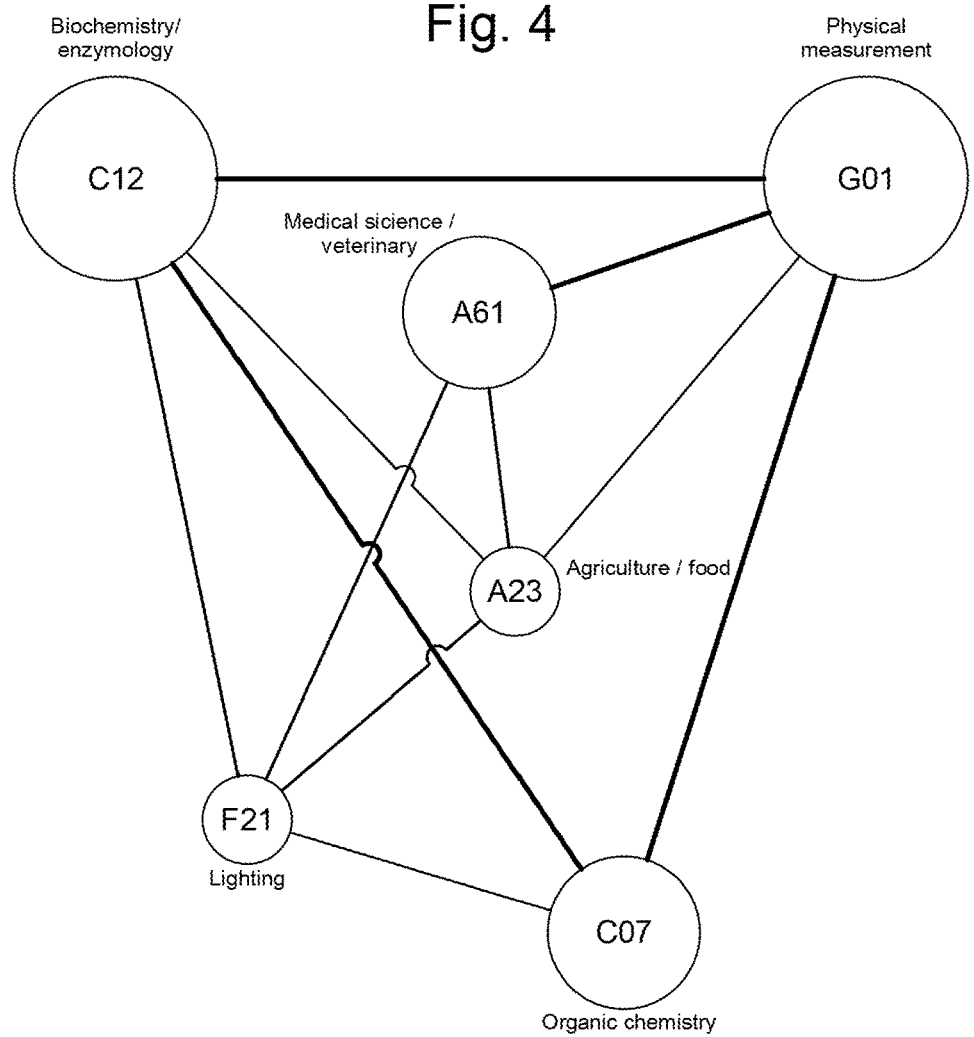
FIG. 4: one example of a network graph illustrating the occurrences and the co-occurrences of technological classes of a real set of Patents.

A pool of around 1000 Patents can be extracted according to a search by key words (title/abstract/claims containing "bioluminescen*"). A quick examination of the pool shows that bioluminescence is mainly used in biomedical research as a biological marker. The two classes the most represented in the pool are the classes (or set of classes) C12 (biochemistry) and G01 (physical measurements). The class relating to lighting applications (F21) is not represented to any extent within the pool. It may be deduced from this that the lighting applications of bioluminescence are not very well developed with respect to the biomedical applications. The application sought by the Patent analyst is therefore a niche application. Table 3 informs on a part of the occurrences and co-occurrences observed over all of the Patents. A display by associated network graph is shown in FIG. 4.

TABLE 3

| classes | C12 | G01 | C07 | A61 | A23 | F21 |
|---|---|---|---|---|---|---|
| C12 | 235 | 456 | 126 | 57 | 3 | 16 |
| G01 |   | 126 | 132 | 452 | 12 | 0 |
| C07 |   |   | 134 | 325 | 0 | 4 |
| A61 |   |   |   | 12 | 15 | 17 |
| A23 |   |   |   |   | 25 | 18 |
| F21 |   |   |   |   |   | 3 |

The graph shows, amongst other things, the co-occurrences of the class F21 (lighting), and thus allows the search for partners to be directed. It is noted that the graph immediately gives access to a label explaining the classes, rather than a single alphanumeric symbol, which allows it to be quickly understood what these classes cover.

It can immediately be seen that bioluminescence does not yet have any link with the classes relating to the watch and clock industry (G04). Accordingly, it will probably therefore be necessary to proceed via adaptations and transfers of technologies in order to achieve the desired application. Over the two main classes of the pool (C12 and G01), F21 does not have any direct link with the G01. It may be deduced from this that it is better to prioritize the searches towards the technological fields linked to the class C12. Furthermore, the link to the organic chemistry class (C07) is weaker than for the other classes. It may be deduced from this that it is better to prioritize the searches towards the other classes by, for example, studying the bioluminescence applications in the agri-food industry (A23). A weighted calculation of distance, using the weighted similarity matrix, would allow the size of the classes adjacent to F21 to be confirmed and to be quantified.

Although particular embodiments have just been described in detail, those skilled in the art will appreciate that various modifications and alternatives to the former may be developed in the light of the overall teaching provided by the present disclosure of the invention. Consequently, the specific arrangements and/or methods described herewithin are intended to be given solely by way of illustration, with no intention to limit the scope of the invention.

The invention claimed is:

1. A method of communication between a user and a database of Patents and of display and interactive exploration of data on information of interest relating to Patents/Patent applications, comprising:

generating, by an access interface, a request allowing the database of Patents to be interrogated based on at least one selection criterion entered into the access interface by the user;

interrogating the database by the request and downloading bibliographical data for the Patents/Patent applications found by the database, the downloaded bibliographical data including data on a technological category;

processing the bibliographical data, the processing including an analysis of co-occurrences, the analysis of co-occurrences including determining a number of co-occurrences of the technological category for all of the Patents/Patent applications found, an analysis including simultaneously determining numbers of occurrences and co-occurrences of the technological category by using a weighted similarity matrix, and an analysis of relationships of technological categories; and displaying, in interactive graphical and/or textual form, a result and/or an interpretation of the analysis of occurrences and co-occurrences, and the data on the information of interest by displaying the relationships of the technological categories in the form of an interactive network graph with nodes and links respectively between two nodes, wherein a number of occurrences is a number of times the technological category is cited in a Patents/Patent applications pool, a number of co-occurrences is a number of times a same group of data on the technological category appears in the Patent/Patent application of a set, a representation of the interactive graph displayed is generated by an artificial intelligence algorithm taking into account a complexity of the graph, the artificial intelligence algorithm is employed to summarize official identifiers and generate labels adapted to the display of the graph, and the labels are associated with the nodes, the labels being generated on a basis of definitions of hierarchical classification symbols including IPC, CPC, and USPC classification symbols.

2. The method according to claim 1, in which the analysis of co-occurrences relates to pairs of data on the technological category.

3. The method according to claim 1, in which the analysis of co-occurrences relates to triplets of data on the technological category.

4. The method according to claim 1, further comprising displaying the data on the information of interest by making control objects available to the user whose actuation or manipulation leads to a new execution of the analysis of co-occurrences with modified parameters.

5. The method according to claim 1, further comprising displaying the data on the information of interest by making control objects available to the user whose actuation or manipulation leads to a filtering of the Patents/Patent applications found by the database and the generation of a corresponding sub-set of Patents/Patent applications.

6. The method according to claim 5, wherein the actuation or the manipulation of the control objects also leads to an execution of an analysis of co-occurrences of the data on the technological category restricted to the sub-set of the Patents/Patent applications.

7. The method according to claim 1, further comprising displaying the data on the information of interest by displaying the result of the analysis of co-occurrences in the form of a network graph in two or three dimensions.

8. The method according to claim 1, wherein the data on technological categories includes technological classification symbols according to a system of hierarchical classification, including IPC, CPC or USPC classification symbols.

9. The method according to claim 8, further comprising displaying the data on the information of interest by displaying the result of the analysis of co-occurrences in the form of an interactive network graph with nodes and links respectively between two nodes, the nodes representing technological classification symbols and the links between two nodes the co-occurrences of the technological classification symbols corresponding to two connected nodes.

10. The method according to claim 9, wherein a visual attribute of each node reflects the number of occurrences of a corresponding technological classification symbol and a visual attribute of each link reflects the number of co-occurrences of the technological classification symbols corresponding to the two connected nodes.

11. The method according to claim 9, wherein the nodes and/or the links constitute interactive elements configured for triggering, following an action by the user, a new execution of the analysis of co-occurrences with modified parameters together with a new display of the result of the new analysis of co-occurrences in the form of an interactive network graph.

12. The method according to claim 9, wherein the nodes and/or the links constitute interactive elements configured for triggering, following an action by the user, a filtering of the Patents/Patent applications found by the database, the generation of a corresponding sub-set of Patents/Patent applications, execution of an analysis of co-occurrences of the data on the technological category restricted to the sub-set of the Patents/Patent applications and a display, in the form of an interactive network graph of the result of the analysis of co-occurrences restricted to the sub-set.

13. The method according to claim 8, wherein the analysis of co-occurrences relates to triplets of technological classification symbols, in which the display comprises the display of the result of the analysis of co-occurrences in the form of an interactive network graph with nodes and complex links respectively between three nodes, the nodes representing technological classification symbols and the complex links between three nodes the co-occurrences of the technological classification symbols corresponding to three connected nodes.

14. The method according to claim 8, wherein a representation of the interactive graph comprises labels associated with the nodes and/or with the labels.

15. The method according to claim 8, wherein the analysis of co-occurrences applies simple elements of graphical theory, including calculation of a distance between nodes selected according to actions of the user.

\* \* \* \* \*